UNITED STATES PATENT OFFICE.

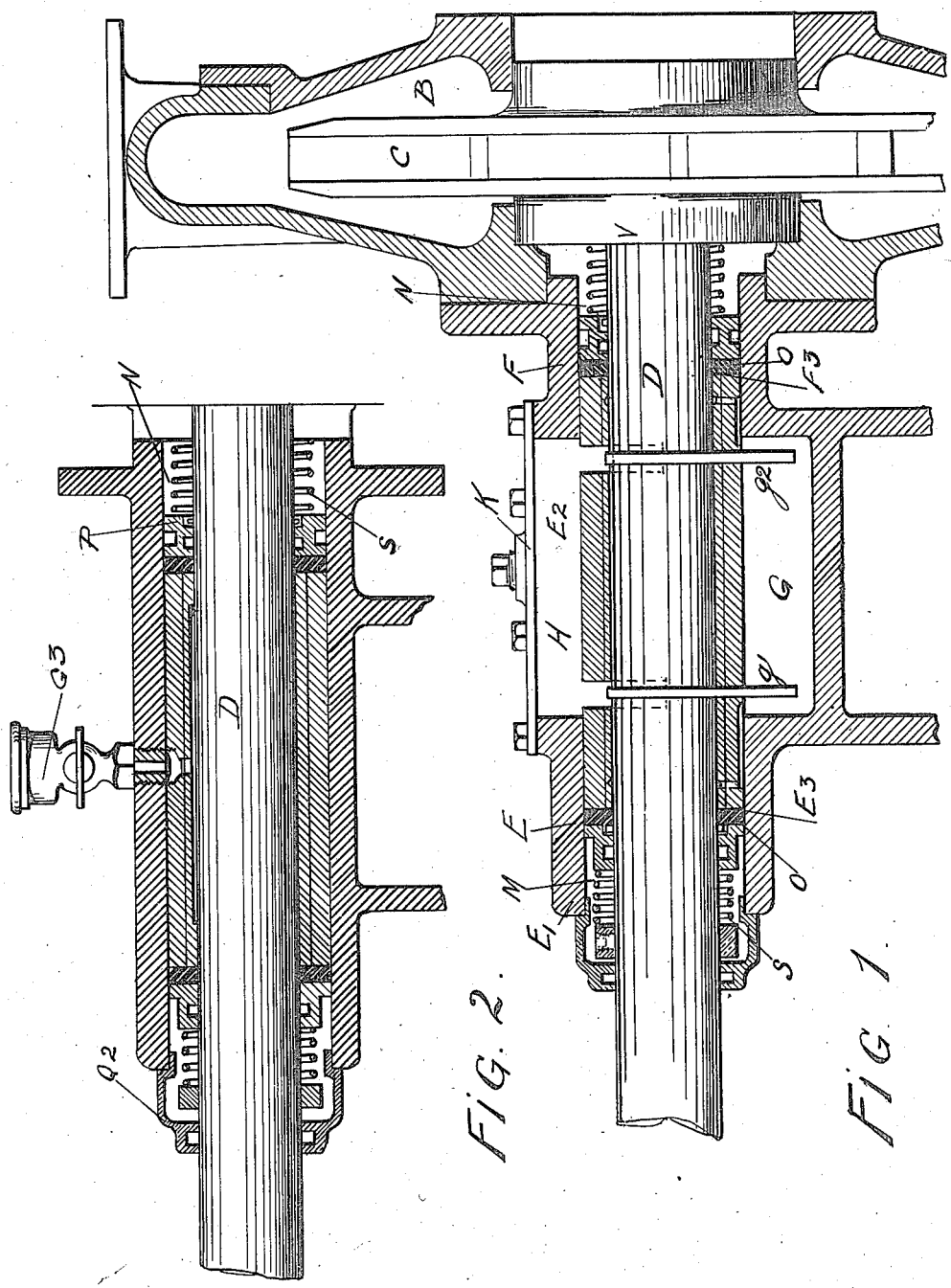

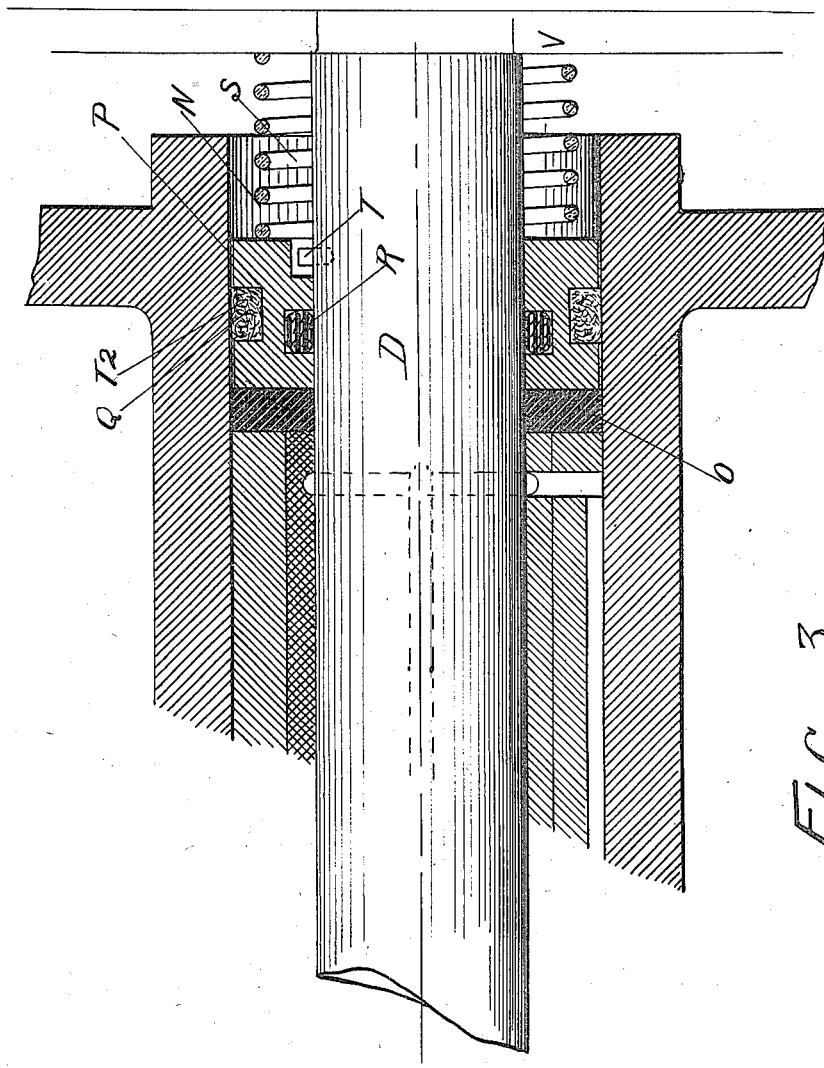

ANDREW P. DRON AND GEORGE W. WILSON, OF FRESNO, CALIFORNIA.

NON-LEAKING BEARING FOR REVOLVING SHAFTS.

1,295,974.  Specification of Letters Patent.  Patented Mar. 4, 1919.

Application filed August 6, 1918. Serial No. 248,657.

*To all whom it may concern:*

Be it known that we, ANDREW P. DRON and GEORGE W. WILSON, citizens of the United States, and residents of the city of Fresno, county of Fresno, and State of California, have invented a new and useful Non-Leaking Bearing for Revolving Shafts, of which the following is a specification.

Our invention relates to a revolving shaft bearing which is non-leaking when under pressure and our object is to produce a bearing of this character without the use of a stuffing box, gland or packing. This character of bearing is especially useful in connection with centrifugal pumps, steam and water turbines and propeller bearings in a steamboat.

In the drawings accompanying this specification Figure 1 shows a sectional elevation of the bearing as used on a centrifugal pump, partly in section. Fig. 2 is a modified form of the oiling system of the bearing. Fig. 3 is an enlarged view of the bearing.

In said drawing B represents an ordinary centrifugal pump having impeller C which is actuated by the main shaft D. Shaft D is carried in bearings E and F shown in Fig. 1 as connected so that an air tight chamber H is formed between them. This chamber is larger in diameter than the shaft, forming an oil well G at the bottom thereof from which oil is carried to the shaft D adjacent to the bearings by means of oil rings $g^1$ and $g^2$. K is a plate or cap over an opening into chamber G.

The bearings E and F consist of a supporting case $E^1$, and a bushing $E^2$. The ends of bushing $E^2$ are formed with approximately true faces $E^3$ and $F^3$, and the supporting case $E^1$ extends beyond the faced ends, forming cylindrical chambers having a common center line with shaft D. These cylindrical chambers have been termed M and N on the drawings. O are thrust washers carried on shaft D adjacent to the faces $E^3$ and $F^3$. Thrust washers O can be constructed of fiber, leather, wood or metal, and should be formed to fit snugly against the faces $E^3$ and $F^3$. P is a thrust bearing constructed preferably of metal and so that it fits snugly on shaft D, and within cylindrical chamber M or N. It should be movable with pressure lengthwise on shaft D, but should be keyed thereto so it will rotate with it. The key used for this purpose is shown on the drawing as T. A groove R has been cut around the interior circumference of thrust bearing P into which a ring of rubber, metal or other suitable material is fitted. This ring should fit tightly around shaft D and also within groove R to make an air-tight joint. $T^2$ is a groove around the outside periphery of thrust bearing P into which a ring Q of felt or some similar substance can be fitted to bear against the wall of cylindrical chamber N its object being to keep sand and dirt from the bearing. S is a compression spring one end of which rests on a base or collar V which is attached to and revolves with shaft D, the other end of the spring being arranged to bear against the thrust bearing P which in turn presses thrust washer O against the face $F^3$ or $E^3$. If there is water, steam, or air pressure in the chamber M or N it will not pass through the bearing F or E.

The groove $T^2$ and felt ring Q therein may be substituted by a dust cap $Q^2$ as shown in Fig. 1, on bearing E, or the oil well G and rings $g^1$ and $g^2$ can be substituted by a grease cup $G^3$ as shown in Fig. 2. The object above described can be accomplished by a single bearing as well as with a double one.

The thrust washer O can be omitted and the thrust bearing P can be ground to fit closely against the faced ends $E^3$ or $F^3$.

Having described our invention we claim:

1. In a non-leaking bearing for a revolving shaft, the combination of a bearing support, the end portions of which are cylindrical and arranged to have a common center line with the shaft, a bushing attached to, and within the bearing support, the bushing having faced ends, thrust washers adjacent to the faced ends of the bushing and surrounding the shaft, a thrust bearing attached to the shaft so that it can slide lengthwise on said shaft, but is locked to rotate with it, and means for pressing said thrust bearings against the thrust washer, substantially as described.

2. In a non-leaking bearing for a revolving shaft, the combination of a bearing support terminating at each end in a cylindrical chamber larger than the shaft and having a common center line with the shaft, a shaft bearing in the bearing support and spaced from the ends thereof, said bearing having faced ends, a thrust washer adjacent to each of the faced ends of the bearing, and a thrust bearing constructed to fit against the thrust washer and being longitudinally movable on the shaft, a collar attached to the shaft, and spring means between the collar and the thrust bearing adapted to press the thrust bearing against the thrust washer, substantially as described and for the purposes set forth.

3. In a non-leaking bearing for a revolving shaft, the combination of a bearing support terminating at each end in a cylindrical chamber larger than the shaft and having a common center line with the shaft, a shaft bearing in the bearing support and spaced from the ends thereof, said bearing having faced ends, a thrust washer adjacent to each of the faced ends of the bearing, and a thrust bearing constructed to fit against the thrust washer and being longitudinally movable on the shaft, and having means thereon to form an air tight connection between the thrust bearing and the shaft consisting of a pliable ring fitted tightly between the shaft and the inside periphery of the thrust bearing.

4. In a non-leaking bearing for a revolving shaft, the combination of a bearing support terminating at each end in a cylindrical chamber larger than the shaft and having a common center line with the shaft, a shaft bearing in the bearing support and spaced from the ends thereof, said bearing having faced ends, a thrust washer adjacent to each of the faced ends of the bearing, and a thrust bearing constructed to fit against the thrust washer and being longitudinally movable on the shaft, a groove around the inside periphery of the thrust bearing, a pliable ring fitted within said groove and constructed to press upon the shaft forming an air-tight fit.

5. In a non-leaking bearing for a revolving shaft, having a bearing chamber, and a bearing bushing faced at each end, attached to the chamber wall, the combination of a thrust washer, a thrust bearing attached to the shaft with an air tight fit, and slidably disposed thereon, and spring means for holding the thrust bearing, the thrust washer and the faced end of the bearing member in close proximity substantially as described and for the purposes set forth.

6. In a non-leaking bearing for a rotary shaft, the combination of an air tight cylindrical bearing chamber, a bushing fitted to an air-tight fit to the wall of the chamber, said bearing being faced on the ends and constructed for the shaft to rotate therein, a thrust washer adapted to approximately cover the faced end of the rotary bearing, a thrust bearing fitted on the shaft with an air tight fit and adapted to slide thereon, a groove around the outside periphery of the thrust bearing and a ring fitted therein so it will bear against the wall of the cylindrical chamber, a collar attached to the shaft and a compression spring placed between the collar and the thrust bearing so that the thrust bearing, the thrust washer and the faced end of the bushing will bear against each other, substantially as described and for the purposes set forth.

7. In a non-leaking bearing for a rotary shaft, the combination of an air tight cylindrical bearing chamber, a bushing fitted to an air tight fit to the inside wall of the chamber, said bushing being faced on the ends and constructed for the shaft to rotate therein, thrust washers adapted to approximately cover the faced ends of the bushing, thrust bearings fitted on the shaft with an air tight fit and adapted to slide thereon, collars attached to the shaft and compression springs placed between the collars and the thrust bearings so that the thrust bearing, the thrust washer and the faced end on each end of the bushing will be adjacent to each other, substantially as described and for the purposes set forth.

ANDREW P. DRON.
GEO. W. WILSON.

Witnesses:
  Cleo K. Curtis,
  Ernest Platte.